DATA STORAGE ACCESS CONTROL APPARATUS FOR A MULTICOMPUTER SYSTEM

Filed March 15, 1967

INVENTORS.
S.F. ARANYI
J.P. BARLOW
L.L. RAKOCZI
L.A. HITTEL
M.A. TORFEH
BY
ATTY.

United States Patent Office 3,505,652
Patented Apr. 7, 1970

3,505,652

DATA STORAGE ACCESS CONTROL APPARATUS FOR A MULTICOMPUTER SYSTEM

Steven F. Aranyi, Westford, Mass., Jesse P. Barlow, Reseda, Calif., Lorenz A. Hittel, Phoenix, Ariz., and Laszlo L. Rakoczi, Newport Beach, and Mark A. Torfeh, Tarzana, Calif., assignors to General Electric Company, a corporation of New York Filed Mar. 15, 1967, Ser. No. 623,284
Int. Cl. G06f *9/18*
U.S. Cl. 340—172.5 2 Claims

ABSTRACT OF THE DISCLOSURE

A multicomputer data processing system is disclosed in which the system's input-output processing unit; for example, can be given exclusive communication with specified data storage members for a specified period of time. If all memory cycles of the storage members are not required by the input-output processing unit during this period, communication between the specified storage members and other processing units is permitted during portions of the specified period which do not conflict with communication between the input-output processing unit and the specified data storage members.

BACKGROUND OF THE INVENTION

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides a portion of the management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units, by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the porcessors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

In providing the management control functions effecting transfer of data items and instructions between the plural processors and the plural data storage units of a multicomputer system, a central controller has been employed to free the processors of the burden of supporting and maintaining these management control functions. Whenever a processor is to communicate with the data storage system to receive or to transmit a data item, the processor supplies one or more signals which constitute a request by the processor to be provided communication with a data storage unit. The central controller responds to these requests and grants communication for the requesting processors with the storage units.

Only one processor at a time may be provided communication with a particular data storage unit of the storage system. Therefore, predetermined priorities are allocated to the processors by the central controller for resolving the conditions wherein two or more processors simultaneously request access to the same data storage unit. The input/output processor is allocated highest priority and, therefore, is granted access when the input/output processor and a data processor simultaneously request access to the same storage unit. However, to provide for maximum speed and efficiency of operation in servicing the rapidly and frequently occurring requests from the data processors and the input/output processor, the central controller normally will not ignore or reject requests from a particular processor merely because a higher priority processor is simultaneously requesting access to the storage system. Instead, each request is recognized if the requested storage unit is not busy, and the recognized request is stored by the central controller. If two or more of the stored requests are made for the same data storage unit, the request corresponding to the highest priority processor is first granted and communication with the requested storage unit by this processor is provided by the central controller. Immediately following completion of the communication provided for this highest priority processor, the request of the next higher priority processor requiring the same storage unit is granted by the central controller and the communication provided. Accordingly, when two or more processors simultaneously request communication with the same data storage unit, the central controller described grants the request of the lower priority requesting processors in sequence immediately after the highest priority requesting processor has completed its communication with the storage unit.

When an input/output processor is to process real-time events, it must receive or transmit data at a rate determined by one or more input or output external devices coupled thereto. When certain input devices supply data, each such item of data must be accepted by the input/output processor and stored in the data storage system within a predetermined time, or the data item will be lost. Similarly, when certain output devices receive data, each required item of data must be retrieved from the storage system and transmitted by the input/output processor within a predetermined time, or the functioning of the output device may become ineffective. Therefore, an input/output device processing real-time events must be granted communication with the storage system at the requisite real-time rate.

The central controller described above grants highest priority to the input/output processor for communication with a data storage unit when data processors at the same time request communication with the same data storage unit. However, this central controller does not permit the input/output processor to preempt a data storage unit. Instead, as described above, after the input/output processor has had granted a communication request for a data storage unit, a simultaneous request made by a data processor for the same data storage unit next will be granted. If the input/output processor immediately returns with another request for the same data storage unit, this second request will not be recognized at once because the data storage unit is busy communicating with the lower priority processor whose request was recognized, but not granted until after the input/output processor completed its first communication with the data storage unit. Similarly, if the request of a data processor is recognized and granted immediately before the input/output processor submits a request for the same data storage unit, the request of the input/output processor will not be recognized until the data processor completes its communication with the data storage unit.

Accordingly, the copending U.S. patent application Ser. No. 618,076, of J.P. Barlow, R. Barton, L. L. Rakoczi, and M. A. Torfeh for Data Storage Access Control Apparatus for a Multicomputer System, filed Feb. 23, 1967, and assigned to the assignee of the instant invention, describes and claims an invention for insuring that the input/output processor, when processing a real-time event, is granted timely communication with the data storage system at a rate commensurate with the rate of the real-time event, by providing apparatus for granting to the input/output processor exclusive communication with the required data storage units. The apparatus described in application S.N. 618,076 initiates the exclusive grant of a data storage unit to the input/output processor when a series of communications with the storage unit must be provided for the input/output processor within a predetermined interval and at a predetermined rate. For example, when satisfying a particular real-time event, the input/output processor may be required to communicate with a data storage unit at a one megacycle rate, or once every microsecond period. However, the time required for the input/output processor to execute each discrete communication with the storage unit may be but a fraction of the requisite real-time period. Thus, a data item may be transferred between the input/output processor and a cell of one rapidly operating type of data storage unit in 300 nanoseconds or less, a duration only $\frac{3}{10}$ of the exemplary one microsecond real-time period. To operate the multicomputer system most efficiently it is desirable to employ the data storage system to the fullest extent possible. Accordingly, when a data storage unit is not actually occupied in communicating with the input/output controller during its handling of a real-time event, the storage unit should be made available for communication with the data processors.

Therefore, it is an object of this invention to provide management control apparatus for enabling improved communication between the processors and the data storage units of a multicomputer system.

Another object of this invention is to provide management control apparatus for granting timely communication betwen the plural processors and the data storage system of a multicomputer system.

Another object of this invention is to provide management control apparatus for effecting most efficient use of the data storage system while insuring that timely communication is provided for a processor handling real-time events in a multicomputer system.

Another object of this invention is to provide apparatus for granting to an input/output processor timely access to a data storage unit of a multicomputer system, while also enabling the data processors to communicate with this storage unit.

SUMMARY OF THE INVENTION

The foregoing objects are achieved, according to one embodiment of the instant invention, by providing in a multicomputer system, apparatus for granting to the input/output processor exclusive communication with the required data storage units only for the actual time required for the input/output processor to effect each communication with a data storage unit. In a multicomputer system, a central controller is coupled to a plurality of data processors, to an input/output processor, and to a data storage system. The central controller provides controllable transmission of data words between each of the processors and the storage system. Each processor supplies a request signal when communication is required with the storage system.

The central controller normally recognizes and stores each processor request if the requested data storage unit is not busy, and grants each stored request, if the request is for a unique storage unit. If two or more stored requests are directed to the same storage unit the central controller grants communication to these requests in sequence according to the respective allocated priorities of the processors originating these requests. However, when the input/output processor must service a real-time event, it transmits a "service mode," "or exclusive use," signal to the central controller. In response to, or exclusive use, a signal, the central controller is normally enabled to discontinue recognition of any request from a data processor so long as the service mode signal persists.

A set of "time balancing" switches is provided to control generation of respective balancing signals of different durations. During the occurrence of a balancing signal the central controller is disabled from ignoring requests from the data processors. An appropriate duration balancing signal is controlled by the manual setting of automatic electrical activation of a corresponding time balancing switch. If a service mode, or exclusive use, signal is being delivered, each time that the input/ouput processor is granted communication with the storage system a balancing signal is triggered, provided that a time balancing switch is "on." During the occurrence of the balancing signal requesting data processors are granted communication with the storage system, but access by the input/output processor is inhibited. The time balancing switch selected must be one which controls a balancing signal having a duration corresponding to the difference between the aforementioned real-time period and the actual data storage unit communication time of the input/output processor.

Thus, the input/output processor is provided with uninterrupted access to the data storage system only as necessary to provide for timely processing of the real-time events. To the extent that the storage system is not required to satisfy the real-time requirements, it is made available to the data processors, thereby insuring most efficient operation of the storage system.

Certain portions of the apparatus herein disclosed are not of our invention, but are the inventions of:

J. R. Hudson, L. L. Rakoczi, D. L. Sansbury, as defined in the claims by their application, Ser. No 646,504, filed June 16, 1967; said application being assigned to the assignee of the present application.

BRIEF DESCRIPTION OF THE DRAWING

The invention will be described with reference to the accompanying drawings, wherein.

Figure 1:
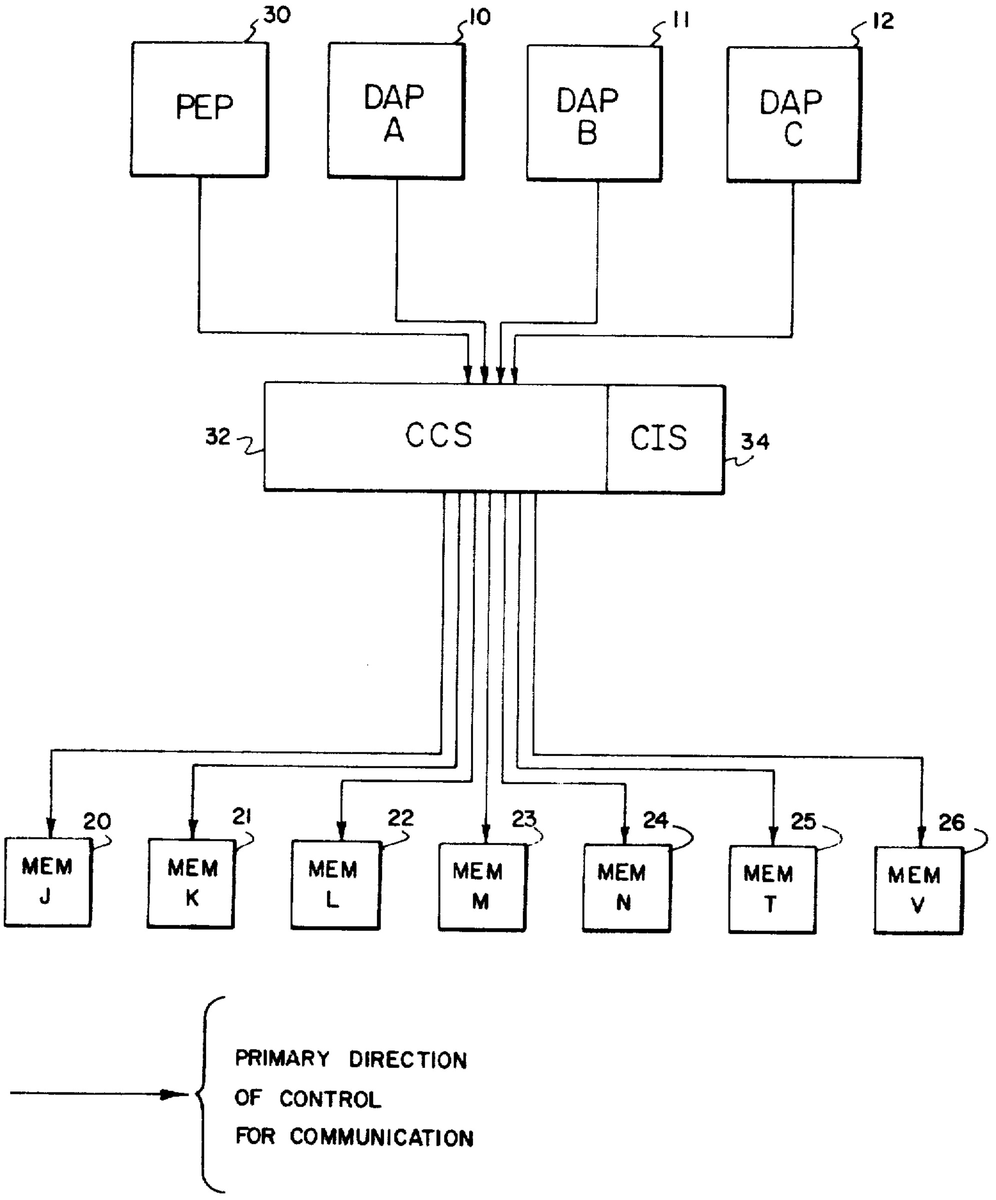
FIGURE 1 is a block diagram of a multicomputer data processing system to which the instant invention is applicable.

For a complete description of the system of FIGURE 1 and of my invention, reference is made to U.S. patent application, Ser. No. 542,768, filed Apr. 15, 1966, entitled, "Centrally Controlled Multicomputer System," by Jesse P. Barlow et al., and assigned to the assignee of the present invention. More particularly, attention is directed to the specification beginning at page B–1, line 5, and ending at page N–64, line 16, inclusive of U.S. patent application, Ser No. 542,768, which is incorporated herein by reference and made a part hereof as if fully set forth herein.

We claim:

1. In combination, a plurality of data storage members, each of said data storage members storing a data word in each one of a respective plurality of storage cells; a data processing unit adapted to receive data words, to execute a sequence of different processing operations on received data words in response to a corresponding sequence of data words representing instructions, and to generate data words representing the processed results of said operations; an input-output processing unit for executing a sequence of operations, for receiving or transmitting data words; a central controller coupled to each of said processing units and to each of said storage members for controlling the transmision of data words between said units and said storage members, each of said units supplying a request signal to the central controller when communication is required with one of said storage members, said central controller normally providing a communication between the corresponding processing unit and the requested member; said controller when it recognizes the request signal of one processing unit not permitting the other processing unit to communicate with the data storage member until the communication of a data word between said one processing unit and requested storage member is completed; said input-output processing unit selectively generating an exclusive use signal having a predetermined duration whenever said input-output processing unit is to be granted exclusive communication with at least one of said storage members; means for selectively generating scope signals, each scope signal designating one of said plurality of storage members; and means for selectively generating a time balancing signal; the duration of exclusive use signal permitting a predetermined plurality of data words to be transferred between the input-output processing unit and storage members designated by scope signals; and means for applying exclusive use, scope, and time balancing signals to the central controller; said central controller in response to the receipt of scope signals and an exclusive use signal prohibiting the data processing unit from communicating with the data storage members corresponding to the scope signals produced for the duration of the exclusive use signal; said means for generating a time balancing signal being initiated by the input-output unit; said time balancing signal terminating before the next request by the input-output unit for access to a storage member designated by the scope signal; said time balancing signal while produced permitting the central controller to permit the data processing unit to communicate with data storage members designated by the scope signals while the exclusive use signal is being generated by the input-output data processing unit.

2. The combination comprising: a data storage member for storing data words in each one of a plurality of storage cells, a plurality of data processing units; a central controller for providing controllable communication between each of said processing units and said storage member, said controller enabling said processing units to receive data words from and to transmit data words to said storage member; means for selectively generating an exclusive use signal for predetermined periods of time to permit a plurality of data words to be communicated between one of said processing units producing said exclusive use signal and said storage member when said processing unit is to be granted exclusive communication with said storage member; means for applying said exclusive use signal to said central controller, said central controller in response to the receipt of an exclusive use signal preventing communication between the others of said processing units and said storage member while the exclusive use signal is being generated; and means for producing a time balancing signal, said time balancing signal having a duration substantially less than the exclusive use signal, said means for producing the time balancing signal producing said signal for a predetermined interval of time initiated by each communication between said one of said processing units and said data storage member, circuit means for applying said time balancing signal to said central controller, said central controller in response to the receipt of the time balancing signal preventing said one of said processing units while the time balancing signal is produced from communicating with said member and permitting communications between the other processing units and said storage member while said time balancing signal is present.

References Cited

UNITED STATES PATENTS

| | | | |
|---|---|---|---|
| 3,225,334 | 12/1965 | Fields et al. | 340—172.5 |
| 3,333,252 | 7/1967 | Shimabukuro | 340—172.5 |
| 3,158,844 | 11/1964 | Bowdle | 340—172.5 |
| 3,226,694 | 12/1965 | Wise | 340—172.5 |
| 3,242,467 | 3/1966 | Lamy | 340—172.5 |
| 3,319,226 | 5/1967 | Mott et al. | 340—172.5 |
| 3,374,465 | 3/1968 | Richmond et al. | 340—172.5 |
| 3,377,579 | 4/1968 | Wissick et al. | 340—172.5 |

PAUL J. HENON, Primary Examiner

H. E. SPRINGBORN, Assistant Examiner